United States Patent
Park

(10) Patent No.: US 9,788,150 B2
(45) Date of Patent: Oct. 10, 2017

(54) METHOD FOR MANAGING DISASTER AND ELECTRONIC DEVICE THEREOF

(71) Applicant: Samsung Electronics Co., Ltd., Gyeonggi-do (KR)

(72) Inventor: Kang-Ho Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/695,448

(22) Filed: Apr. 24, 2015

(65) Prior Publication Data
US 2015/0334544 A1   Nov. 19, 2015

(30) Foreign Application Priority Data

May 16, 2014   (KR) .................. 10-2014-0058779

(51) Int. Cl.
*H04W 4/02*   (2009.01)
*H04W 4/22*   (2009.01)
*H04W 4/00*   (2009.01)

(52) U.S. Cl.
CPC ............. *H04W 4/02* (2013.01); *H04W 4/023* (2013.01); *H04W 4/22* (2013.01); *H04W 4/008* (2013.01); *H04W 4/027* (2013.01)

(58) Field of Classification Search
CPC ......... H04W 4/02; H04W 4/22; H04W 4/023; H04W 4/008; H04W 4/027
See application file for complete search history.

(56) References Cited

U.S. PATENT DOCUMENTS

| | | | |
|---|---|---|---|
| 2005/0197096 A1* | 9/2005 | Yang .................. | H04L 12/1895 455/404.1 |
| 2006/0235833 A1* | 10/2006 | Smith .................. | H04W 4/22 |
| 2008/0070546 A1* | 3/2008 | Lee .................. | G08B 25/016 455/404.2 |
| 2009/0061891 A1* | 3/2009 | Chung .................. | G01S 11/02 455/456.1 |
| 2010/0315230 A1* | 12/2010 | Kwon .................. | G08B 25/007 340/540 |
| 2011/0026452 A1* | 2/2011 | Kang .................. | H04B 7/155 370/315 |
| 2011/0201911 A1* | 8/2011 | Johnson ............. | A61B 5/14532 600/365 |
| 2011/0279263 A1* | 11/2011 | Rodkey ................ | G08B 25/002 340/539.13 |
| 2013/0214925 A1* | 8/2013 | Weiss .................. | G08B 25/001 340/539.11 |

(Continued)

FOREIGN PATENT DOCUMENTS

KR   10-2012-0068649 A   6/2012

*Primary Examiner* — Dinh P Nguyen
(74) *Attorney, Agent, or Firm* — Cha & Reiter, LLC

(57) ABSTRACT

A method of operating an electronic device when a disaster occurs and disaster information is received. The disaster information may be relayed by an external electronic device, a server, or could be detected by one or more sensors within the electronic device that detect a possible emergency such as the user has fallen, or there has been impact sensed consistent with an accident, etc. The method includes receiving disaster information, determining whether a rescue request will be made by analyzing the disaster information, and transmitting rescue request information based on the determination result. An electronic device is configured to perform the method.

18 Claims, 10 Drawing Sheets

(56) References Cited

U.S. PATENT DOCUMENTS

2013/0339019 A1* 12/2013 Giancarlo ............... G10L 15/04
704/251
2014/0244034 A1* 8/2014 Toda ........................ B25J 9/161
700/245

* cited by examiner

METHOD FOR MANAGING DISASTER AND ELECTRONIC DEVICE THEREOF

CLAIM OF PRIORITY

This application claims the benefit under 35 U.S.C. §119(a) from a Korean patent application Serial No. 10-2014-0058779, filed in the Korean Intellectual Property Office on May 16, 2014, the entire disclosure of which is hereby incorporated by reference in its entirety.

BACKGROUND

1. Technical Field

The present disclosure relates to a method operated by an electronic device for managing disasters such as accidents and electronic device thereof.

2. Description of the Related Art

Due to the development of information communication technologies and semiconductor technologies, various electronic devices have been developed as multimedia devices with capabilities that provide various multimedia services. For example, an electronic device provides various multimedia services such as a messenger service, a broadcasting service, a wireless Internet service, a camera service, and a music reproduction service.

The electronic device may provide accident detection functions for detecting an accident such as user of the device abrupt falling down, an impact, and a silent behavior that may be consistent with an emergency health problem, and the functions of the electronic device are selectively used by manually enabling or disabling the functions.

However, the accident detection functions are manually switched on or off by the user such that they cannot be practically employed as accidents often come without warning, and when the functions are always switched on in general use, power is unnecessarily consumed and a malfunction is caused.

Accordingly, there is a need in the art for a disaster management method and apparatus that overcomes at least the aforementioned obstacles.

SUMMARY

Aspects of the present disclosure provide a disaster management method in which an accident detection function is enabled in a specific situation, and an electronic device employing the same.

Another aspect of the present disclosure is to provide a disaster management method in which an accident detection function is enabled or disabled in association with disaster information, and an electronic device employing the same.

Another aspect of the present disclosure is to provide a disaster management method for detecting a dangerous situation regarding the user and intuitively making a rescue request, and an electronic device employing the same.

In accordance with an aspect of the present disclosure, a method of an electronic device includes receiving disaster information, determining whether a rescue request is to be made by analyzing the disaster information, and transmitting rescue request information according to the determination result which is typically wireless transmitting the rescue request information.

In accordance with another aspect of the present disclosure, an electronic device includes a communication module for receiving disaster information, and a processor for determining whether a rescue request is to be made by analyzing the disaster information, and transmitting rescue request information according to the determination result.

According to the present disclosure, a convenience and safety of the user can be improved by activating an accident detection function in a specific situation.

According to the present disclosure, unnecessary power consumption can be prevented and a malfunction can be lessened by the electronic device enabling or disabling an accident detection function in association with disaster information.

According to the present disclosure, safety can be improved/secured by detecting a dangerous situation of the user and intuitively making a rescue request.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of the present disclosure will become more apparent from the following detailed description taken in conjunction with the accompanying drawings, in which.

DETAILED DESCRIPTION

Figure 1:
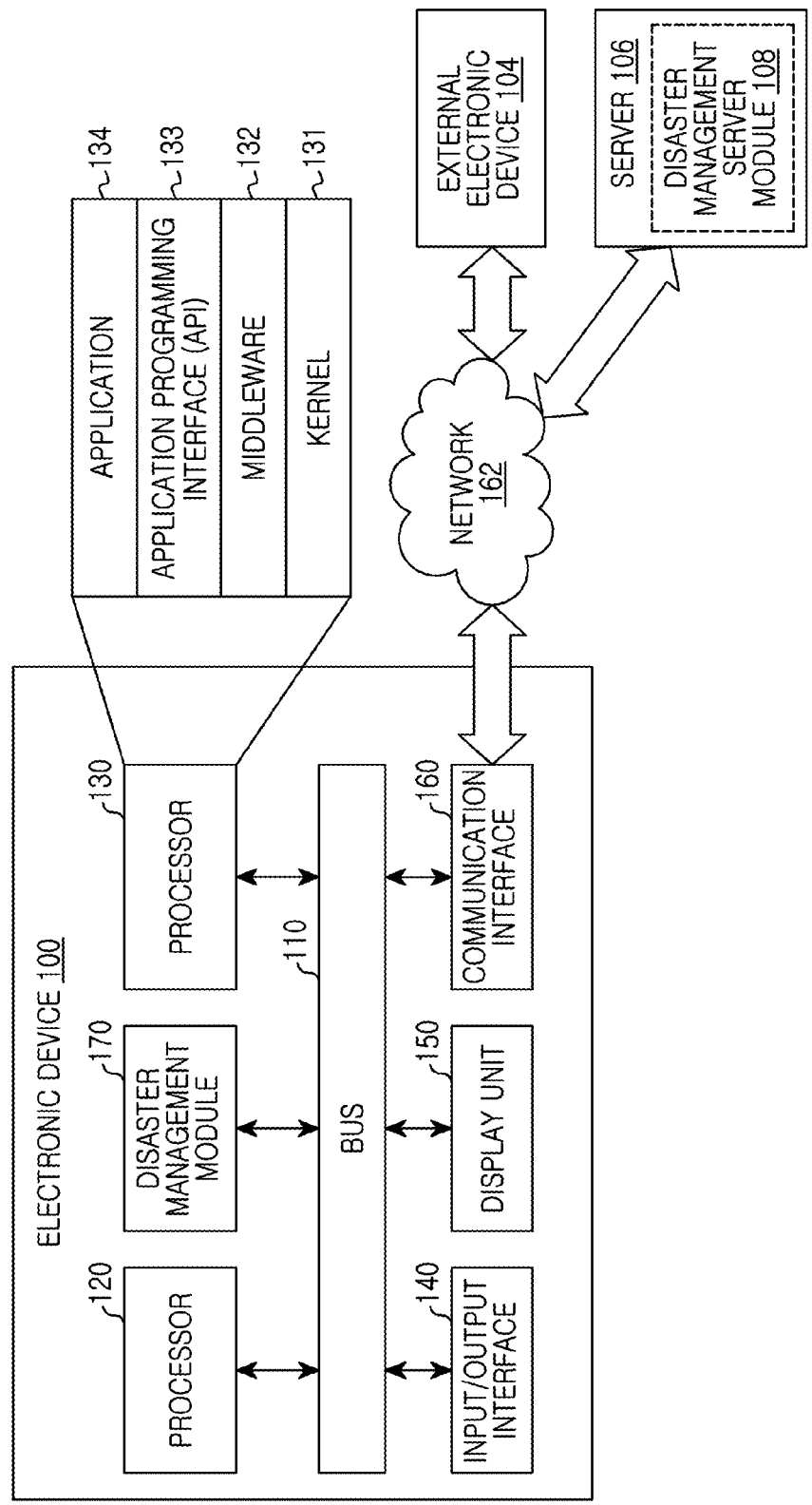
FIG. 1 is a block diagram of an electronic device according to an embodiment of the present disclosure.

The following description with reference to the accompanying drawings is provided to assist a person of ordinary skill in the art with a comprehensive understanding of various embodiments of the present disclosure as defined by the claims and their equivalents. Although the detailed description includes various specific details to assist the person of ordinary skill in the art with that understanding, these details are to be regarded as merely exemplary. Accordingly, those of ordinary skill in the art will recognize that various changes and modifications of the various embodiments described herein can be made without departing from the scope and spirit of the present disclosure. However, the description is not intended to limit the present disclosure to the specific embodiments, and the person of ordinary skill in the art shall appreciate that all the changes, equivalents and substitutions belonging to the idea and technical scope of the present disclosure are included in the present disclosure. In the description of the drawings, identical or similar reference numerals are typically used to designate identical or similar elements.

The term "include" or "may include" refers to the existence of a corresponding disclosed function, operation or component which can be used in various embodiments of the present disclosure and does not limit the appended claims to one or more additional functions, operations, or components. Further, as used in embodiment of the present disclosure, the terms "include", "have" and their conjugates may be construed to denote a certain characteristic, number, step, operation, task, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The above expressions may be used merely for the purpose of distinguishing one element from the other elements. For example, a first electronic device and a second electronic device indicate different electronic devices although both of them are electronic devices. For example, without departing from the scope of the present disclosure, a first component element may be named a second component element. Similarly, the second component element also may be named the first component element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

In the present disclosure, the terms are used to describe a specific embodiment, and do not limit the appended claims to the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art as understood by the person of ordinary skill, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic "appcessory", an electronic tattoo, and a smart watch.

According to an embodiment, an electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves).

An electronic device according to various embodiments of the present disclosure may be a combination of one or more of the above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 is a block diagram of an electronic device according to an embodiment of the present disclosure;

Referring now to FIG. 1, the electronic device 100 may include a bus 110, a processor 120, a non-transitory memory 130, an input/output interface 140, a display 150, a communication interface 160, and a disaster management module 170. According to an embodiment of the present disclosure, the disaster management module 170 may be included in the processor 120, or may be included in a separate module that interacts with the processor 120, for example, via the bus 110, to load machine executable code, or by operation of its processor or sub-processor.

The bus 110 may be a circuit that interconnects the above-described elements and delivers communications (for example, a control message) between the above-described elements.

For example, the processor 120 may receive commands from the above-described other elements (for example, the non-transitory memory 130, the input/output interface 140, the display 150, the communication interface 160, and the disaster management module 170) through the bus 110, decipher the received commands, and perform calculation or data processing according to the deciphered commands.

The memory 130 may store a command or data received from the processor 120 or other component elements, for example, the input/output interface 140, the display 150, the communication interface 160, or the disaster management module 170, or generated by the processor 120 or other elements.

The non-transitory memory 130 may include programming modules, for example, a kernel 131, a middle ware 132, an Application Programming Interface (API) 133, and an application 134. Each of the above-described programming modules may include hardware circuitry configured for operation, that executes machine executable code. Hardware such as microprocessors, processors, etc., may be configured for operation.

According to an embodiment of the present disclosure, the kernel 131 may control or manage system resources (for example, the bus 110, the processor 120, and the memory 130), and can be used to execute an operation or function implemented in the remaining programming modules, for example, the middle ware 132, the API 133, and the application 134. The kernel 131 may provide an interface that allows the middle ware 132, the API 133, or the application 134 to access an individual element of the electronic device 100 for control or management.

According to an embodiment of the present disclosure, the middleware 132 may serve as an intermediary such that the API 133 or the application 134 communicates with the kernel 131 to transmit/receive data. In relation to operation requests received from the application 134, the middle ware 132 may execute a control (for example, scheduling or load balancing) for an operation request, through use of, for example, a method of assigning a priority of use of a system resource of the electronic device 100 (for example, the bus 110, the processor 120, or the memory 130) to at least one of application 134.

According to an embodiment of the present disclosure, the API 133 is an interface used by the application 134 to control a function provided from the kernel 131 or the middle ware 132, and may include, for example, at least one interface or function (for example, an instruction) for a file control, a window control, image processing, or a character control.

According to an embodiment of the present disclosure, the application 134 may include, as disclosed by the following non-limiting examples, an SMS/MMS application, an e-mail application, a calendar application, a notification application, a health care application, for example, an application for measuring an amount of exercise or blood sugar, and an environmental information application, for example, an application for providing atmospheric pressure, humidity information, and temperature information, just to name a few non-limiting possibilities. Additionally or alternatively, the application 134 may be an application associated with exchanging of information between the electronic device 100 and an external electronic device (for example, an electronic device 100). The application associated with the exchanging of information may include, for example, a notification relay application for transferring predetermined information to an external electronic device or a device management application for managing an external electronic device.

For example, with reference to FIG. 1, the notification relay application may include a function of transferring, to the external electronic device, for example, the electronic device 104, notification information generated from other applications of the electronic device 100 (for example, an SMS/MMS application, an e-mail application, a health management application, and an environmental information application). Additionally or alternatively, the notification relay application may receive notification information from, for example, an external electronic device (for example, the electronic device 104), and may provide the notification information to a user. The device management application may manage (for example, install, delete, or update), for example, a function of at least a part of an external electronic device (for example, the electronic device 104) that communicates with the electronic device 100 (for example, turning on/off the external electronic device (or a few components) or adjusting brightness (or resolution) of a display), an application operated in the external electronic device, or a service provided from the external electronic device (for example, a call service or a message service).

In accordance with various embodiments, the application 134 may include an application designated according to an attribute (for example, a type of the electronic device) of an external electronic device (for example, the external electronic device 104). For example, when the external electronic device is an MP3 player, the application 134 may include an application related to the reproduction of music. Similarly, when the external electronic device is a mobile medical device, the application 134 may include an application related to health care. According to an embodiment of the present disclosure, the application 134 may include at least one of applications received from an application designated for the electronic device 100 or an application received from an external electronic device (for example, the server 106 or the external electronic device 104).

According to an embodiment of the present disclosure, the input/output interface 140 may transmit a command or data input from the user through an input/output device (for example, a sensor, a keyboard, or a touch screen) to the processor 120, the memory 130, the communication interface 160, or the disaster management module 170 through, for example, the bus 110. For example, the input/output interface 140 may provide data associated with a touch of a user input through a touch screen to the processor 120. The input/output interface 140 may output, for example, a command or data received through the bus 110 from the processor 120, the memory 130, the communication interface 160, and the disaster management module 170, through an input/output device (for example, a speaker or a display). For example, the input/output interface 140 may output voice data processed by the processor 120 to the user through a speaker.

The display 150 may display various pieces of information (for example, multimedia data or text data) to the user.

According to an embodiment of the present disclosure, the communication interface 160 may connect communication between the electronic device 100 and an external electronic device (for example, the electronic device 104 or the server 106). For example, the communication interface 160 of the electronic device 100 may be connected to the network 162 through wireless communication or wired communication, and may communicate with an external device. The wireless communication may include at least one of, for example, Wi-Fi, Bluetooth (BT), Near Field Communication (NFC), Global Positioning System (GPS) and cellular communication (for example, LTE, LTE-A, CDMA, WCDMA, UMTS, WiBro, or GSM). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present disclosure, the network 162 may be a telecommunication network. The telecommunication network may include at least one of a computer network, Internet, Internet of Things (IoT), and a telephone network. According to an embodiment of the present disclosure, a protocol (for example, a transport layer protocol, a data link layer protocol, or a physical layer protocol) for the communication between the electronic device 100 and the external device may be supported by at least one of the application 134, the application programming interface 133, the middleware 132, the kernel 131, and the communication interface 160.

According to an embodiment of the present disclosure, the disaster management module 170 may analyze acquired disaster information to determine whether a rescue request will be made, and transmit rescue request information to the external electronic device (for example, the electronic device 104, server 106 or the like) according to the determination result. For example, the disaster information may include at least one of disaster type information, disaster occurrence time information, disaster occurrence location information, disaster scale information, and disaster continuance time information.

According to an embodiment of the present disclosure, the disaster management module 170 may determine whether a rescue request will be made, by comparing the disaster occurrence location information of the disaster information with location information of the electronic device 100.

According to an embodiment of the present disclosure, the disaster management module 170 may enable an accident detection mode for detecting a specific movement, according to the comparison result. For example, the specific movement may include at least one of a fall from a specific height, a movement for a specific time period, and an external impact. According to an embodiment of the present disclosure, the disaster management module 170 may disable an accident detection mode when ceasing of the disaster information is received or a specific time elapses.

According to an embodiment of the present disclosure, the server 106 may support driving of the electronic device 100 by performing at least one of the operations (or functions) implemented by the electronic device 100. For example, the server 106 may include a disaster management server module 108 for supporting the disaster management module 170 implemented in the electronic device 100. According to an embodiment of the present disclosure, the disaster management server module 108 may include at least one element of the disaster management module 170, and may perform (for example, as a proxy for the electronic device 100) at least one of the operations performed by the disaster management module 170.

According to an embodiment of the present disclosure, the disaster management module 170 may process at least some pieces of the information obtained from other elements (for example, the processor 120, the non-transitory memory 130, the input/output interface 140, and the communication interface 160) and provide them to the user in various manners. For example, the disaster management module 170 may control at least some functions of the electronic device 100 by using the processor 120 or independently therefrom such that the electronic device 100 interworks with another electronic device (for example, the external electronic device 104 or the server 106). According to an embodiment of the present disclosure, at least one element of the disaster management module 170 may be included in the server 106 (for example, the disaster management server module 108), and may receive at least one operation, which is performed by the disaster management module 170, from the server 106.

Figure 2:
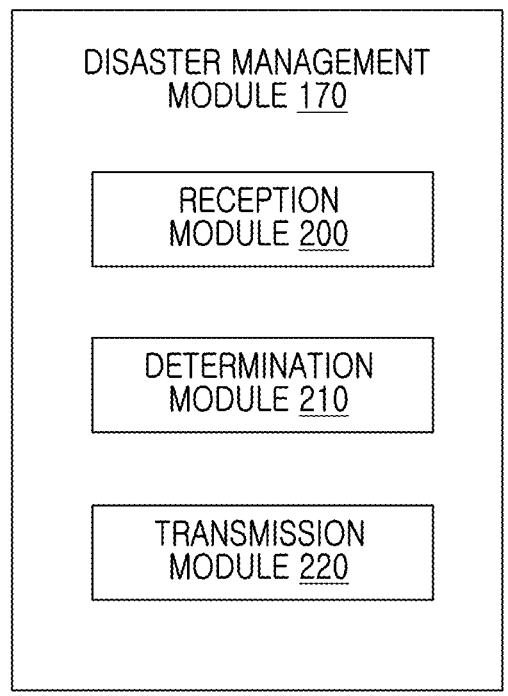
FIG. 2 is a block diagram of a disaster management module according to an embodiment of the present disclosure.

FIG. 2 is a block diagram of a disaster management module according to an embodiment of the present disclosure.

Referring now to FIG. 2, the disaster management module 170 may include a reception module 200, a determination module 210, and a transmission module 220. These modules are not software per se and typically include hardware circuitry not limited as a processor, microprocessor, etc. the execution of their functions may be performed by a single processor or separately as the case may be.

Figure 3:
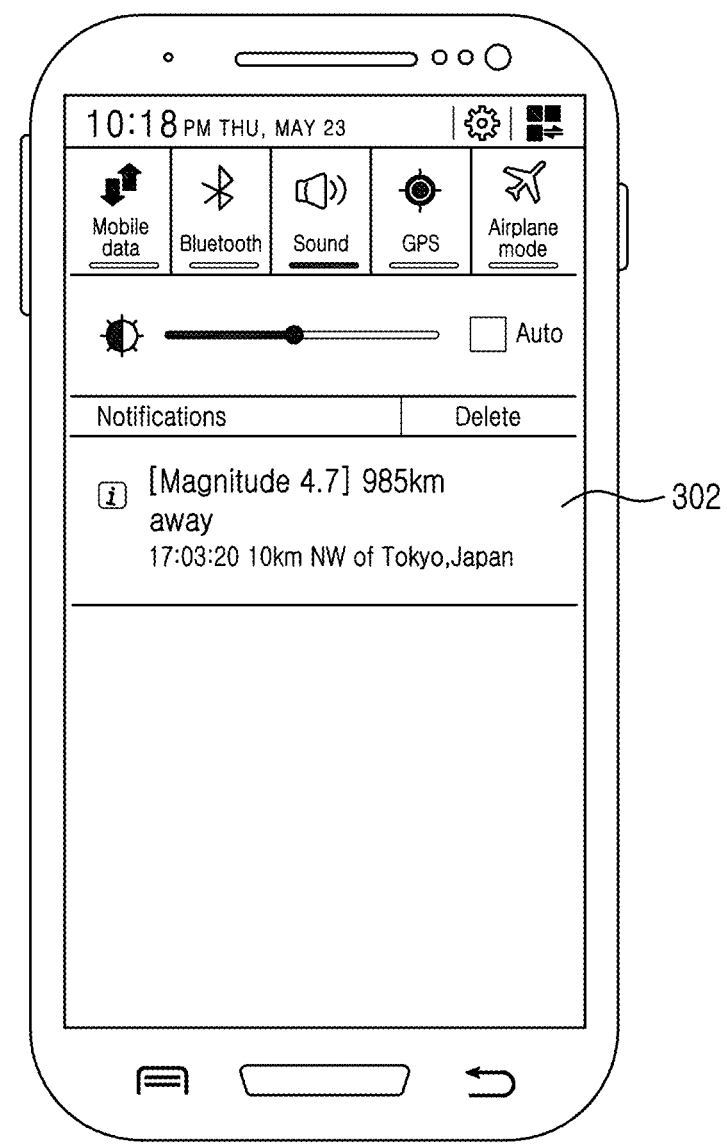
FIG. 3, FIG. 4 and FIG. 5 illustrate respective screens for displaying disaster information received by an electronic device according to an embodiment of the present disclosure, in which disaster information is received through a notification bar about an earthquake as illustrated in FIG. 3, receiving disaster information through a widget update 402 as illustrated in FIG. 4, or receiving disaster information through a message window 502 as illustrated in FIG. 5.
Figure 4:
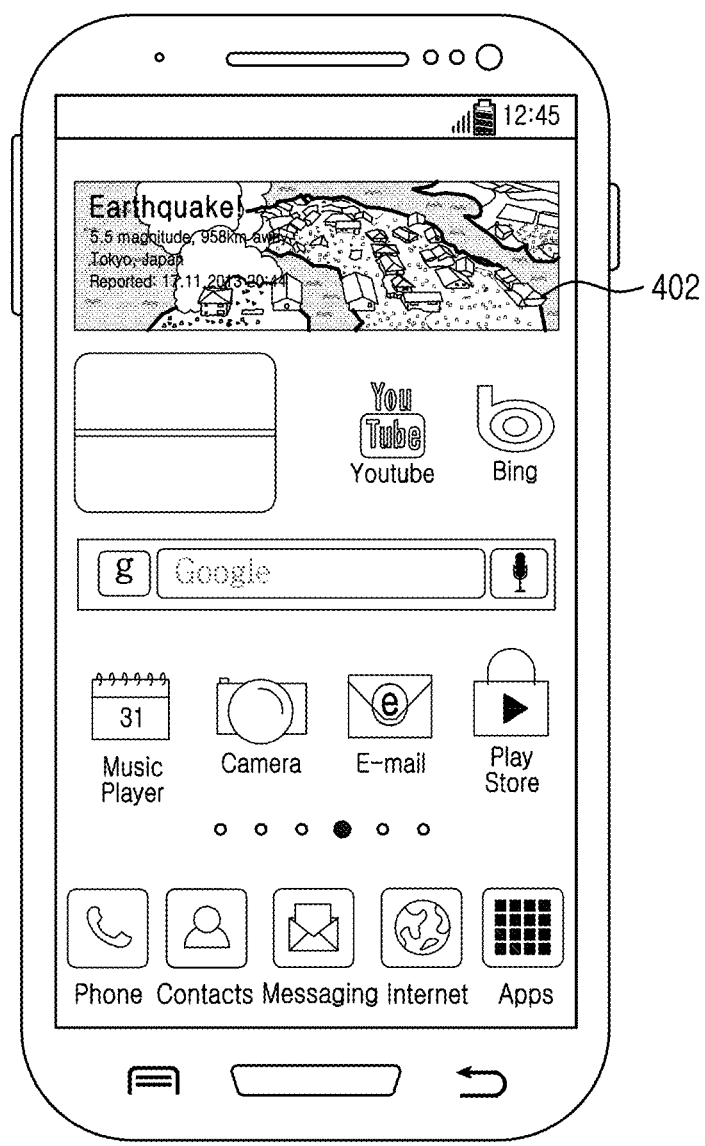
Figure 5:
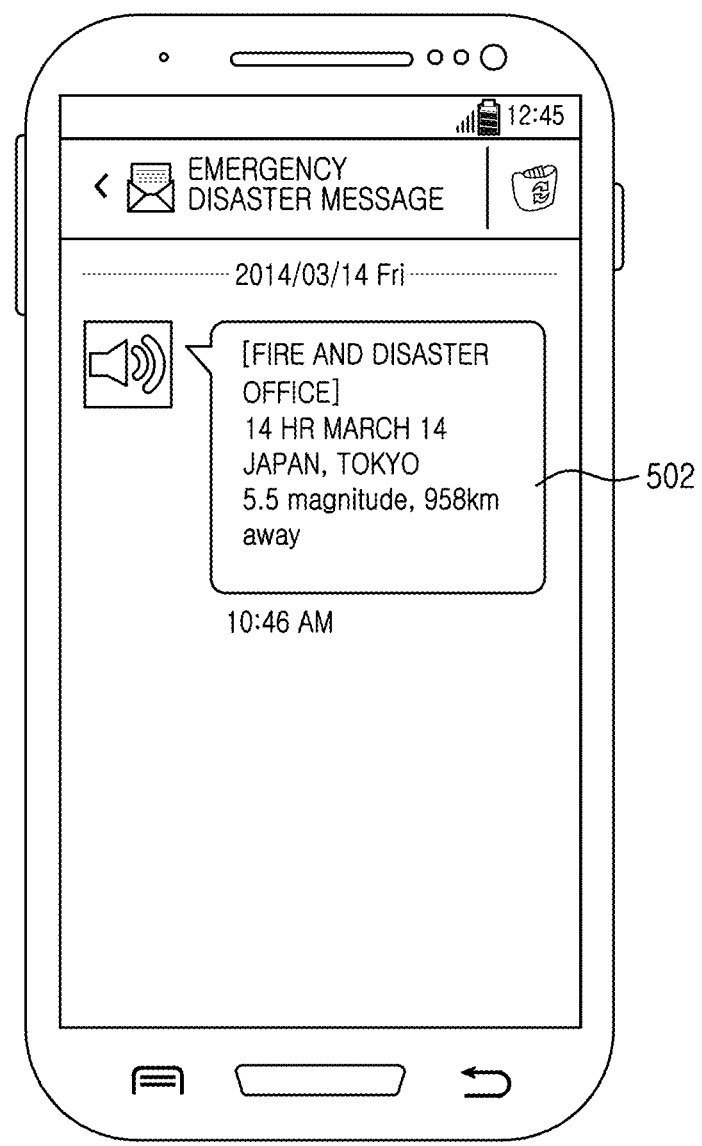

According to an embodiment of the present disclosure, the reception module 200 may receive disaster information from the external electronic device (e.g. 104). The reception module 200 may receive disaster information through a notification delivery application, a widget application, or a message application. For example, the reception module 200 may receive disaster information that is displayed to the user through a notification bar 302 of the electronic device, such as illustrated in FIG. 3, may receive disaster information that is displayed to the user through a widget update 402, such as illustrated in FIG. 4, and may receive disaster information that is displayed to the user through a message window 502, such as illustrated in FIG. 5. According to an embodiment of the present disclosure, the disaster information may include at least one of disaster type information, disaster occurrence time information, disaster occurrence location information, disaster scale information, and disaster continuance time information. For example, the disaster type information may include a cause of a disaster or a type of a disaster (for example, an earthquake, a surge, a tsunami, an eruption of a volcano, a terrorist attack, a fire, a collapse, a flood, a heavy rain, a storm, or a drought).

According to an embodiment of the present disclosure and with continued reference to FIG. 2, the determination module 210 may analyze disaster information to determine whether a rescue request can be made. The determination module 210 may determine whether a rescue request will be made, by comparing disaster occurrence location information with location information of the electronic device. For example, the determination module 210 may determine whether the current location of the electronic device is associated with the disaster occurrence location. According to an embodiment of the present disclosure, the determination module 210 may calculate a distance between the disaster occurrence location and the location of the electronic device to determine whether the distance is within a reference distance to make a rescue request. According to an embodiment of the present disclosure, the determination module 210 may determine whether the electronic device is located within a specific radius from the disaster occurrence point. According to an embodiment of the present disclosure, the determination module 210 may enable an accident detection mode for detecting a specific movement, according to the distance comparison result. For example, the accident detection mode may be a detection mode for predicting an accident that may be caused by a disaster. According to an embodiment of the present disclosure, the determination module 210 may detect a specific movement of the electronic device in an accident detection mode. According to an embodiment, the specific movement may include at least one of a fall from a specific height, a movement for a specific time period, and an external impact. For example, the determination module 210 may detect an operation of abruptly dropping an electronic device carried by the user, an operation of not moving an electronic device for a predetermined period of time after a strong impact, or an operation of falling down, using an acceleration sensor.

According to an embodiment of the present disclosure, the transmission module 220 of the electronic device 100 may transmit rescue request information to the external electronic device 104. For example, the rescue request information may include at least some pieces of disaster information, and at least one of location information, contact site information, and user identification information of the electronic device 100. According to an embodiment of the present disclosure, the transmission module 220 may transmit rescue request information through at least one of an emergency message, an emergency call, and an emergency email. According to an embodiment of the present disclosure, the transmission module 220 may periodically or continuously transmit rescue request information to a rescue center situated near the electronic device or a designated phone number. According to various embodiments of the present disclosure, a primary rescue request information and a secondary rescue request information transmitted by the transmission module 220 may be different. For example, the secondary rescue request information may be partially the same as the primary rescue request information, and may include location information of the electronic device that is changed according to movements of the user. According to various embodiments of the present disclosure, after transmitting the rescue request information, the transmission module 220 may display identification of the transmission on the display 150. According to various embodiments of the present disclosure, the transmission module 220 may inquire of the user about whether a rescue request has been made before transmitting rescue request information, or may automatically transmit rescue request information when an input is not present for a predetermined period of time after the user has inquired.

Figure 7:
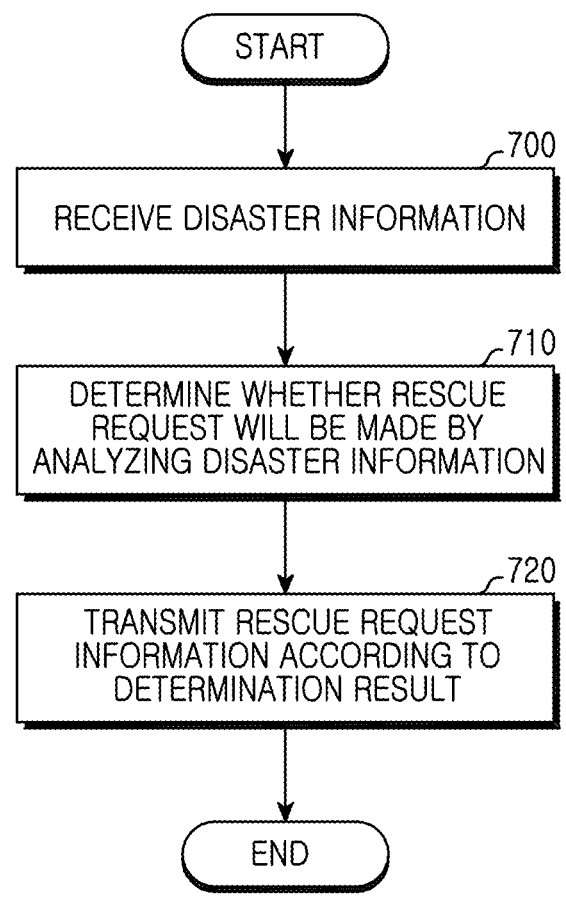
FIG. 7 is a flowchart illustrating a procedure for transmitting rescue request information based on disaster information in an electronic device according to an embodiment of the present disclosure.

FIG. 7 is a flowchart illustrating a procedure for transmitting a rescue request information based on disaster information in an electronic device according to an embodiment of the present disclosure.

Referring now to FIG. 7, at operation 700 the electronic device (for example, the electronic device 100) may receive disaster information. According to an embodiment of the present disclosure, the electronic device 200 may receive disaster information through a notification delivery application, a widget application, or a message application.

For example, the user may receive disaster information through a notification bar 302 of the electronic device as illustrated in FIG. 3, may receive disaster information through a widget update 402 as illustrated in FIG. 4, and may receive disaster information through a message window 502 as illustrated in FIG. 5. However, the present disclosure is not limited thereto, and the received disaster information may be displayed through various methods. According to an embodiment of the present disclosure, the disaster information may include at least one of disaster type information, disaster occurrence time information, disaster occurrence location information, disaster scale information, and disaster continuance time information. For example, the disaster type information may include a cause of a disaster or a type of a disaster (for example, an earthquake, a surge, a tsunami, an eruption of a volcano, a fire, a collapse, a flood, nuclear power plant radiation leak, a heavy rain, a storm, or a drought). These disasters may also have associated severity information (e.g. is the flood eight inches of water or three feet, for example).

At operation 710, the electronic device may determine whether a rescue request will be made, by analyzing disaster information. According to an embodiment of the present disclosure, the electronic device may determine whether a rescue request will be made, by comparing disaster occurrence location information with location information of the electronic device. For example, the electronic device may determine whether the current location of the electronic device is associated with the disaster occurrence location. According to an embodiment of the present disclosure, the electronic device may calculate a distance between the disaster occurrence location and the location of the electronic device to determine whether the distance is within a reference distance. According to an embodiment of the present disclosure, the electronic device may determine whether the electronic device is located within a specific radius from the disaster occurrence point, but the reference distance is not limited to a radius. According to an embodiment of the present disclosure, the electronic device may enable an accident detection mode for detecting a specific movement, according to the distance comparison result. For example, the accident detection mode may be a detection mode for predicting an accident that may be caused by a disaster. According to an embodiment of the present disclosure, the electronic device may detect a specific movement of the electronic device in an accident detection mode. According to an embodiment, the specific movement may include at least one of a fall from a specific height, a movement for a specific time period, and an external impact. In addition, loud noise, for example the shattering of glass, the sound of gunshots, could be part of the criteria. Voice recognition, such as user shouting out "Help Me!", "Emergency!" or "Call Police!, Ambulance!, or Fire Department!" could all be criteria which cause the electronic device to act to protect the user.

For example, the electronic device may detect an operation of abruptly dropping an electronic device carried by the user, an operation of not moving an electronic device for a predetermined period of time after a strong impact, or an operation of falling down, using an acceleration sensor. In addition, in a vehicle, upon deployment of an airbag the vehicle may send out a Bluetooth signal so that the respective electronic devices of passengers in the car would receive the emergency signal and place a request for assistance.

Figure 6:
FIG. 6 illustrates a screen shot illustrating an emergency mode of an electronic device according to an embodiment of the present disclosure.

At operation 700, the electronic device 100 may transmit rescue request information according to the determination result. According to an embodiment of the present disclosure, the rescue request information may include at least some report of disaster information, and at least one of location information, contact site information, and user identification information of the electronic device. According to an embodiment of the present disclosure, the electronic device may transmit rescue request information through at least one of an emergency message, an emergency call, and an emergency email. According to an embodiment of the present disclosure, the electronic device may periodically or continuously transmit rescue request information to a rescue center situated near the electronic device or to a designated number or numbers. According to various embodiments of the present disclosure, primary rescue request information and secondary rescue request information transmitted by the electronic device may be different. For example, the secondary rescue request information may be partially the same as the primary rescue request information, and may include location information of the electronic device that is changed according to movements of the user. According to various embodiments of the present disclosure, after transmitting the rescue request information, the electronic device may display identification of the transmission on the display 150. According to various embodiments of the present disclosure, the electronic device may inquire of the user about whether a rescue request has already been made prior transmitting rescue request information, or may automatically transmit rescue request information when an input is not present for a predetermined period of time after the user is inquired of According to various embodiments of the present disclosure, when a specific movement is detected as illustrated in FIG. 6, the mode of the electronic device may be converted into an emergency mode that provides one or more hotkeys for immediately performing an emergency message function 602 and an emergency call function 604 to a designated phone number. The user may also be prompted to confirm a disaster exists or that he/she wants a recue request made. The rescue request information is transmitted to a rescue center periodically or continuously in which the rescue center is situated within a predetermined distance of the electronic device or to a designated phone number.

Figure 8:
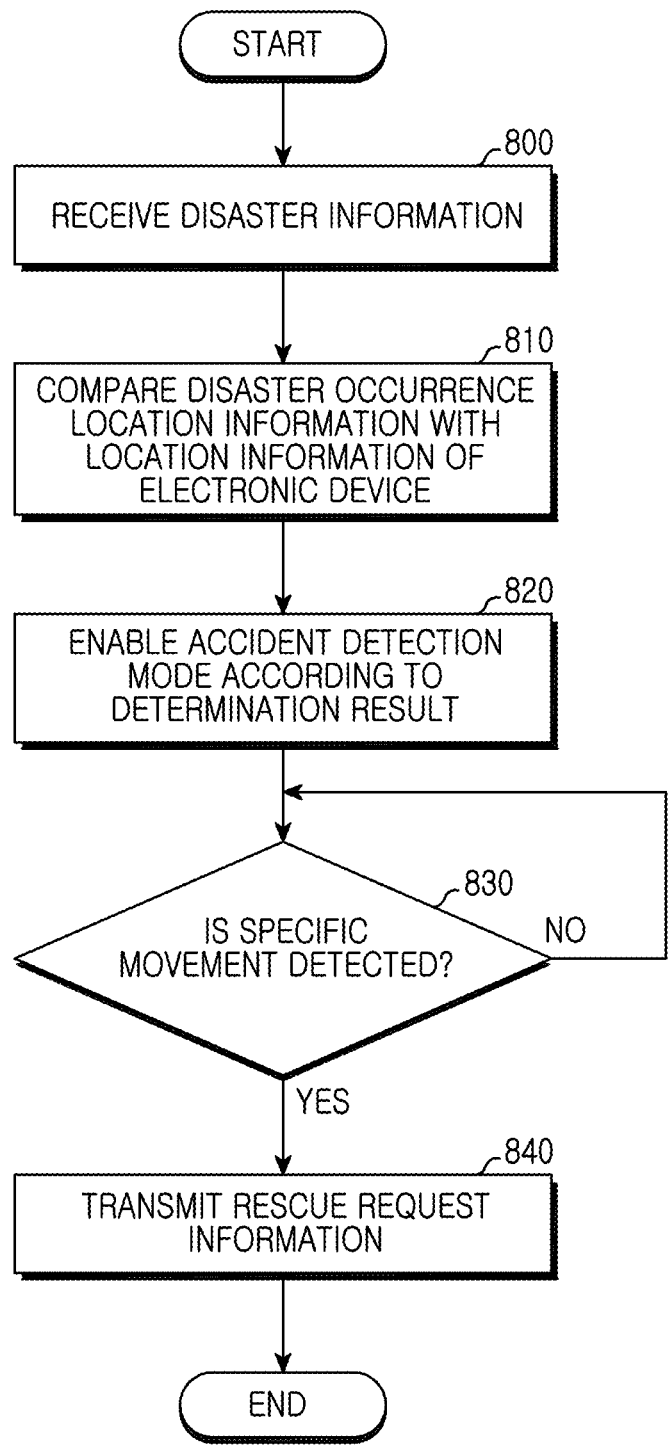
FIG. 8 is a flowchart illustrating a procedure for transmitting rescue request information based on disaster information in an electronic device according to an embodiment of the present disclosure.

FIG. 8 is a flowchart illustrating a procedure for transmitting rescue request information based on disaster information in an electronic device according to an embodiment of the present disclosure.

Referring now to FIG. 8, at operation 800, the electronic device (for example, the electronic device 100) may receive disaster information. According to an embodiment of the present disclosure, the electronic device 200 may receive disaster information through a notification delivery application, a widget application, or a message application. For example, the user may receive disaster information through a notification bar 302 of the electronic device, such as illustrated in FIG. 3, may receive disaster information through a widget update 402, such as illustrated in FIG. 4, and may receive disaster information through a message window 502, such as illustrated in FIG. 5. However, the present disclosure is not limited thereto, and the received disaster information may be displayed through various methods and may include sound alerts. According to an embodiment of the present disclosure, the disaster information may include at least one of disaster type information, disaster occurrence time information, disaster occurrence location information, disaster scale information, and disaster continuance time information.

For example, the disaster type information may include a cause of a disaster or a type of a disaster (for example, an earthquake, a surge, a tsunami, an eruption of a volcano, a fire, a collapse, a flood, a heavy rain, a storm, or a drought).

At operation 810, the electronic device may compare disaster occurrence location information with the location information of the electronic device. For example, the electronic device may determine whether the current location of the electronic device is associated with the disaster occurrence location. According to an embodiment of the present disclosure, the electronic device may calculate a distance between the disaster occurrence location and the location of the electronic device to determine whether the distance is within a reference distance. According to an embodiment of the present disclosure, the electronic device may determine whether the electronic device is located within a specific radius from the disaster occurrence point.

At operation 820, the electronic device may enable an accident detection mode according to the comparison result. For example, the accident detection mode may be a detection mode for predicting an accident that may be caused by a disaster.

At operation 830, the electronic device may determine whether a specific movement has been detected. According to an embodiment, the specific movement may include at least one of a fall from a specific height, a movement for a specific time period, and an external impact. For example, the electronic device may detect an operation of abruptly dropping an electronic device carried by the user, an operation of not moving an electronic device for a predetermined period of time after a strong impact, or an operation of falling down, using an acceleration sensor.

At operation 840, when a specific movement is detected, the electronic device may transmit rescue request information. For example, the rescue request information may include at least some pieces of disaster information, and at least one of location information, contact site information, and user identification information of the electronic device. According to an embodiment of the present disclosure, the electronic device may transmit rescue request information through at least one of an emergency message, an emergency call, and an emergency email. According to an embodiment of the present disclosure, the electronic device may periodically or continuously transmit rescue request information to a rescue center situated near the electronic device or a designated number until an acknowledgement is received, or the user indicates the transmission of rescue request information is to stop. According to various embodiments of the present disclosure, primary rescue request information and secondary rescue request information that are transmitted by the electronic device may be different. For example, the secondary rescue request information may be partially the same as the primary rescue request information, and may include location information of the electronic device that is changed according to movements of the user. According to various embodiments of the present disclosure, after transmitting the rescue request information, the electronic device may display identification of the transmission on the display 150. The information may include some personal information about the user that could be of value to a first responder, such as person's age, weight, height, any serious underlying medical conditions (person has a bad heart, etc.), information about whether the person may not be ambulatory (e.g. utilizes a motorized wheelchair). According to various embodiments of the present disclosure, the electronic device may inquire of the user about whether a rescue request has been made before transmitting rescue request information, or may automatically transmit rescue request information when an input is not present for a predetermined period of time after the user has inquired. According to various embodiments of the present disclosure, when a specific movement is detected as illustrated in FIG. 6, the mode of the electronic device may be converted into an emergency mode that provides a hotkey for immediately performing an emergency message function 602 and an emergency call function 604 to a designated phone number.

Figure 9:
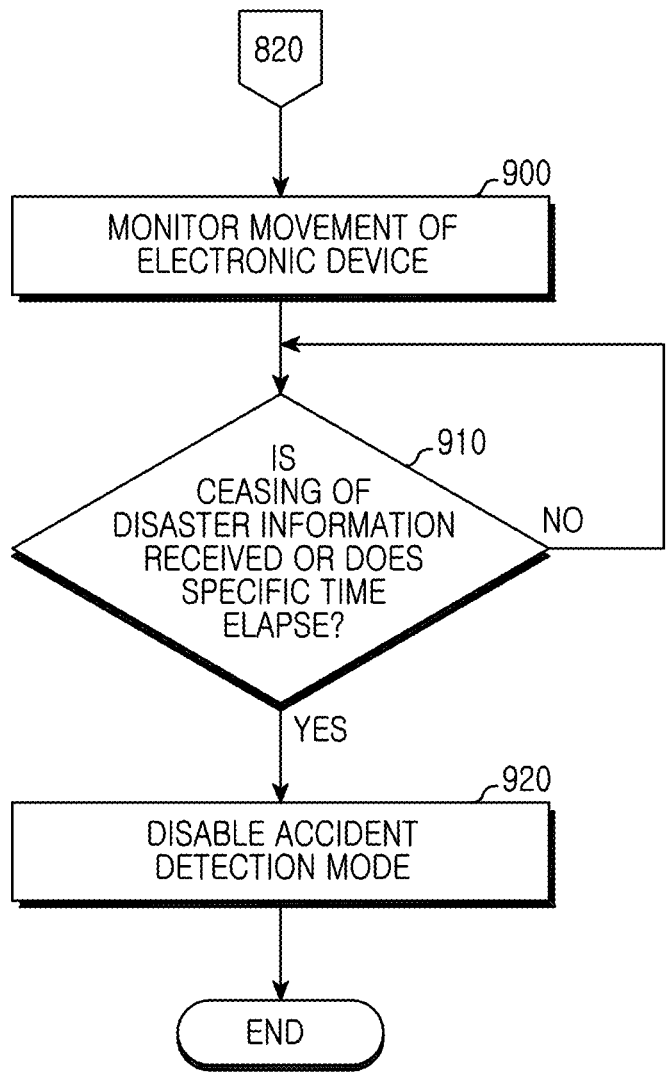
FIG. 9 is a flowchart illustrating a procedure for managing an accident detection mode in an electronic device according to an embodiment of the present disclosure.

FIG. 9 is a flowchart illustrating a procedure for managing an accident detection mode in an electronic device according to an embodiment of the present disclosure.

Referring now to FIG. 9, after enabling an accident detection mode in operation 820 (FIG. 8), at operation 900 the electronic device (for example, the electronic device 100) may monitor a movement of the electronic device so as to detect, for example, falling, impact, etc. According to an embodiment, the electronic device may detect at least one of a fall from a specific height, a movement for a specific time period, and an external impact. More particularly, the electronic device may detect an operation of abruptly dropping an electronic device carried by the user, an operation of not moving an electronic device for a predetermined period of time after a strong impact, or an operation of falling down, using an acceleration sensor.

At operation 910, the electronic device may determine whether there receiving of disaster information has ceased, or whether a specific time elapses. According to an embodiment of the present disclosure, the electronic device 200 may be informed of disaster information through a notification delivery application, a widget application, or a message application. Furthermore, if a specific time elapses after the disaster information is received, the electronic device may determine that the corresponding disaster has ceased.

When there is a ceasing of receiving disaster information, or when the specific time elapses, the electronic device may disable an accident detection mode in operation 920. For example, the mode of the electronic device may be returned back into a state (a normal mode) before the accident detection mode was started.

Figure 10:
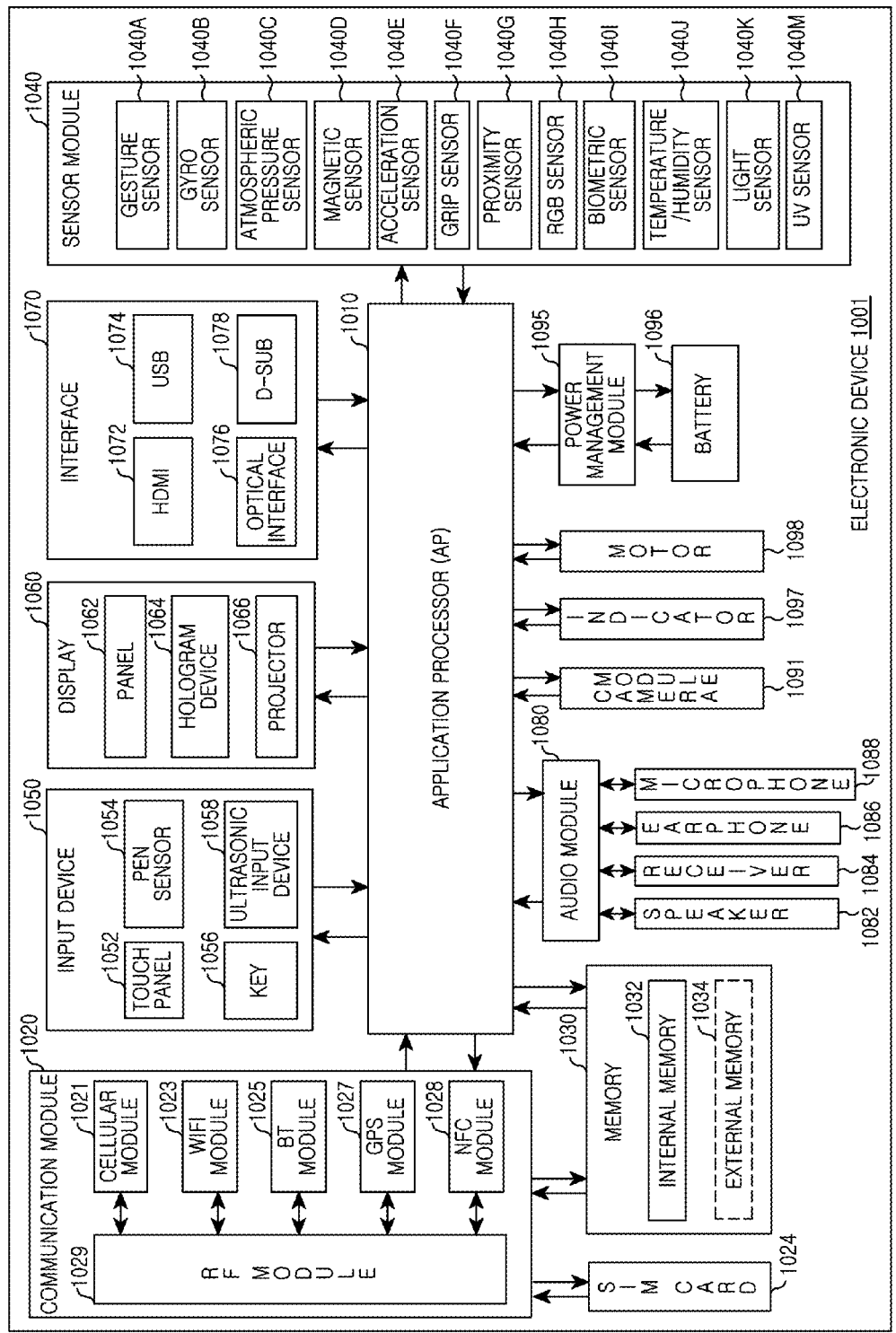
FIG. 10 is a block diagram illustrating hardware components of an electronic device according to various embodiments of the present disclosure.

FIG. 10 is a block diagram illustrating an electronic 1001 device according to various embodiments of the present disclosure. The electronic device 1001 may configure, for example, the whole or a part of the electronic device 100 illustrated in FIG. 1.

Referring now to FIG. 10, the electronic device may include at least one application processor (AP) 1010, a communication module 1020, a Subscriber Identification Module (SIM) card 1024, a non-transitory memory 1030, a sensor module 1040, an input unit 1050, a display unit 1060, an interface 1070, an audio module 1080, a camera module 1091, a power management module 1095, a battery 1096, an indicator 1097, and a motor 1098.

The AP 1010 contains circuitry that may control a plurality of hardware or software components connected to the AP 1010 by driving an operating system or an application program and perform processing of various pieces of data including multimedia data and calculations. The AP 1010 may be implemented by, for example, a System on Chip (SoC). According to one embodiment, the AP 1010 may further include a Graphic Processing Unit (GPU).

The communication module 1020, which includes hardware to transmit and receive in various protocols, may perform data transmission/reception in communication between the electronic device 1001 (for example, the electronic device 100) and other electronic devices (for example, the electronic device 104 or the server 106) connected to the electronic device 1001 through the network. According to an embodiment, the communication module 1020 may include a cellular module 1021, a Wi-Fi module 1023, a BT module 1025, a GPS module 1027, an NFC module 1028, and a Radio Frequency (RF) module 1029.

The cellular module 1021 may provide a voice call, a video call, a Short Message Service (SMS), or an Internet service through a communication network (for example, LTE, LTE-A, CDMA, WCDMA, UMTS, WiBro, or GSM). Furthermore, the cellular module 1021 may distinguish between and authenticate electronic devices within a communication network by using, for example, a subscriber identification module (for example, the SIM card 1024). According to one embodiment, the cellular module 1021 may perform at least some functions which the AP 1010 may provide. For example, the cellular module 1021 may perform at least some of the multimedia control functions.

According to one embodiment, the cellular module 1021 may include a Communication Processor (CP), which includes hardware circuitry configured for operation. Furthermore, the cellular module 1021 may be implemented by, for example, an SoC. Although the components such as the cellular module 1021 (for example, a communication processor), the memory 1030, and the power management module 1095 are illustrated as components separate from the AP 1010 in FIG. 10, the AP 1010 may include at least some of the above-described components (for example, the cellular module 1021) according to one embodiment.

According to an embodiment of the present disclosure, the AP 1010 or the cellular module 1021 (for example, communication processor) may load a command or data received from at least one of a non-volatile memory and other elements connected thereto in a volatile memory, and may process the loaded command or data. Furthermore, the AP 1010 or the cellular module 1021 may store data received from or generated by at least one of other elements in a non-volatile memory.

Each of the Wi-Fi module 1023, the BT module 1025, the GPS module 1027, and the NFC module 1028 may include, for example, a processor for processing data transmitted/received through the corresponding module. Although the cellular module 1021, the WiFi module 1023, the BT module 1025, the GPS module 1027, and the NFC module 1028 are illustrated as separate blocks in FIG. 10, at least some (for example, two or more) of the cellular module 1021, the WiFi module 1023, the BT module 1025, the GPS module 1027, and the NFC module 1028 may be included in one Integrated Chip (IC) or one IC package in one embodiment. For example, at least some (for example, the communication processor corresponding to the cellular module 1021 and the WiFi processor corresponding to the WiFi module 1023) of the processors corresponding to the cellular module 1021, the WiFi module 1023, the BT module 1025, the GPS module 1027, and the NFC module 1028 may be implemented as one SoC.

With continued reference to FIG. 10, the RF module 1029 may transmit and receive data, for example, an RF signal. Although not illustrated, the RF module 1029 may include, for example, a transceiver, a Power Amp Module (PAM), a frequency filter, a Low Noise Amplifier (LNA), or the like. The RF module 1029 may further include additional hardware components for transmitting/receiving electronic waves over a free air space in wireless communication, for example, a conductor, a conducting wire or the like. Although the cellular module 1021, the Wi-Fi module 1023, the BT module 1025, the GPS module 1027, and the NFC module 1028 share one RF module 1029 in FIG. 10, at least one of the cellular module 1021 the Wi-Fi module 1023, the BT module 1025, the GPS module 1027, and the NFC module 1028 may transmit/receive an RF signal through a separate RF module in one embodiment.

The SIM card 1024 may be a card including a subscriber identification module, and may be inserted into a slot formed in a particular portion of the electronic device. The SIM card 1024 may include unique identification information (for example, an Integrated Circuit Card IDentifier (ICCID)) or subscriber information (for example, an International Mobile Subscriber IDentity (IMSI)).

The non-transitory memory 1030 (for example, the memory 130) may include an internal memory 1032 or an external memory 1034. The internal memory 1032 may include various hardware, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment of the present disclosure, the internal memory 1032 may be a Solid State Drive (SSD). The external memory 1034 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 1034 may be functionally connected with the electronic device 1001 through various interfaces. According to one embodiment, the electronic device 1001 may further include a storage device (or a storage medium) such as a hard disk drive.

The sensor module 1040 includes one or more various sensors that may measure a physical quantity or detect an operative state of the electronic device 1001, and may convert the measured or detected information to an electrical signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (for example, red, green, and blue (RGB) sensor), a biometric sensor 10401, a temperature/humidity sensor 1040J, an illumination sensor 1040K, and a Ultra Violet (UV) sensor 1040M. Additionally or alternatively, the sensor module 1040 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 1040 may further include a control circuit for controlling one or more sensors included in the sensor module 1040.

The input device 1050 may include a touch panel 1052, a (digital) pen sensor 1054, a key 1056, or an ultrasonic input device 1058. The touch panel 1052 may recognize a touch input in at least one of, for example, a capacitive scheme, a resistive scheme, an infrared scheme, and an acoustic wave scheme. Further, the touch panel 1052 may include a control circuit. In the case of the capacitive type touch panel, physical contact or proximity recognition is possible and may both be used for operation. The touch panel 1052 may further include a tactile layer. In this event, the touch panel 1052 may provide a tactile response to the user.

The (digital) pen sensor 1054 may be implemented, for example, using the same or similar method to receiving a user's touch input or using a separate recognition sheet. The key 1056 may include, for example, a physical button, an optical key, or a keypad. The ultrasonic input device 1058 may identify data by detecting an acoustic wave with a microphone (for example, microphone 1088) of the electronic device 1001 through an input unit generating an ultrasonic signal, and may perform wireless recognition. According to an embodiment, the electronic device 1001 may receive a user input from an external device (for example, computer or server) connected thereto using the communication module 1020.

With continued reference to FIG. 10, the display 1060 may include a panel 1062, a hologram device 1064 or a projector 1066. The panel 1062 may be, for example, a Liquid Crystal Display (LCD) or an Active Matrix Organic Light Emitting Diode (AM-OLED). The panel 1062 may be implemented to be, for example, flexible, transparent, or wearable. The panel 1062 may be configured as one module together with the touch panel 1052. The hologram device 1064 may show a stereoscopic image in the air using interference of light. The projector 1066 may project light onto a screen to display an image. The screen may be located, for example, inside or outside the electronic device 1001. According to one embodiment, the display 1060 may further include a control circuit for controlling the panel 1062, the hologram device 1064, or the projector 1066.

The interface 1070 may include various hardware configure for operation, for example, a High-Definition Multimedia Interface (HDMI) 1072, a Universal Serial Bus (USB) 1074, an optical interface 1076, or a D-subminiature (D-sub) 1078. The interface 1070 may be included in, for example, the communication interface 160 illustrated in FIG. 1. Additionally or alternatively, the interface 1070 may include, for example, a Mobile High-definition Link (MHL) interface, a Secure Digital (SD) card/Multi-Media Card (MMC) interface, or an Infrared Data Association (IrDA) standard interface.

The audio module 1080 includes an audio processor including hardware circuitry configured for operation and may bilaterally convert a sound and an electronic signal. The audio module 1080 may process sound information input or output through, for example, the speaker 1086, the receiver 1084, the earphones 1086, the microphone 1088 or the like.

The camera module 1091 is a device for capturing a still image or a moving image (video), and according to an embodiment, may include one or more image sensors (for example, a front sensor or a rear sensor) including but not limited to a CMOS or CCD, a lens (not illustrated), an Image Signal Processor (ISP) (not illustrated), or a flash (not illustrated) (for example, an LED or Xenon lamp).

The power management module 1095 may manage power of the electronic device 1001. Although not illustrated, the power management module 1095 may include hardware configured for operation, for example, a Power Management Integrated Circuit (PMIC), a charger Integrated Circuit (IC), or a battery or fuel gauge. The PMIC may be mounted to, for example, an integrated circuit or an SoC semiconductor.

Charging methods may be classified into, for example, a wired charging method and a wireless charging method. The charger IC may charge a battery and prevent over voltage or over current from a charger. According to one embodiment, the charger IC may include a charger IC for at least one of the wired charging method and the wireless charging method. Examples of the wireless charging method may include a magnetic resonance type, a magnetic induction type, or an electromagnetic wave type, and an additional circuit for wireless charging, such as a coil loop circuit, a resonance circuit, or a rectifier circuit may be added.

The battery gauge may measure, for example, a remaining quantity of the battery 1096, or a voltage, a current, or a temperature during the charging. The battery 1096 may store or generate electricity, and may supply power to the electronic device 1001 using the stored or generated electricity. The battery 1096 may include, for example, a rechargeable battery or a solar battery.

The indicator 1097 may display a specific status of the electronic device 1001 or the part (for example the AP 1010) of the electronic device 1001, for example, a booting status, a message status, a charging status, and the like. The motor 1098 may convert an electrical signal to a mechanical vibration. Although not illustrated, the electronic device 1001 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

The apparatuses and methods of the disclosure can be implemented in hardware, and in part as firmware or as software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se.

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include circuitry such as at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (for example, modules or functions thereof) or the method (for example, operations) according to the present disclosure may be implemented by a command stored in a computer-readable non-transitory storage medium in a programming module form. When the command is executed by one or more processors (for example, the processor 120), the one or more processors may execute a function corresponding to the command. The computer-readable storage medium may be, for example, the memory 130. At least a part of the programming module may be implemented (for example, executed) by, for example, the processor 120. At least some of the programming modules may include, for example, a module, a program, a routine, a set of instructions or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which can be executed in a computer by using an interpreter, as well as machine codes made by a compiler. A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium that stores commands is set to allow at least one processor to perform at least one operation when the commands are executed by the processor, and the at least one operation may include an operation of receiving disaster information, an operation of determining whether a rescue request will be made, by analyzing the disaster information, and an operation of transmitting rescue request information according to the determination result.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. A method in an electronic device, the method comprising:
   obtaining disaster information through at least one disaster information service while the electronic device is in a normal mode;
   comparing a second location information corresponding to the disaster information with a first location information of the electronic device;
   determining whether the first location information of the electronic device is associated with the second location information;
   converting to an accident detection mode for detecting a user state from the normal mode when the first location information corresponds to the second location information;
   monitoring a specific movement of the electronic device during a first time period in the accident detection mode;
   outputting notification information during a second time period upon the specific movement is detected by the monitoring;
   after outputting the notification information, determining whether a user input associated with the notification information is detected;
   transmitting rescue request information upon the user input is not detected during a third time period; and
   converting to the normal mode from the accident detection mode, upon the specific movement is not detected or the user input is detected.

2. The method according to claim 1, wherein the disaster information is received from at least one of a sensor of the electronic device, an external electronic device and a server.

3. The method according to claim 1, wherein the transmitting the rescue request information comprises prompting a user for confirmation.

4. The method according to claim 3, wherein the rescue request information is automatically transmitted upon no response to prompting the user is received within a predetermined time period.

5. The method of claim 1, wherein the disaster information comprises at least one of a disaster type information, a disaster occurrence time information, a disaster occurrence location information, a disaster scale information, and a disaster continuance time information.

6. The method of claim 1, wherein the determining the first location information and the second location information comprises comparing disaster occurrence location information according to the disaster information with location information of the electronic device.

7. The method of claim 6, further comprising enabling an accident detection mode for detecting the specific movement of the electronic device according to the comparison result.

8. The method of claim 7, wherein the specific movement comprises at least one of a fall from a specific height, a movement for a specific time period, or an external impact.

9. The method of claim 7, further comprising disabling the accident detection mode when the electronic device ceases receiving the disaster information, or a specific time elapses.

10. The method of claim 1, wherein the rescue request information comprises at least some disaster information, and at least one of a location information, a contact site information, and a user identification information of the electronic device.

11. The method of claim 1, wherein the rescue request information is transmitted with the rescue request through at least one of an emergency message, an emergency call, and an emergency email.

12. The method of claim 1, wherein the rescue request information is transmitted to a rescue center periodically or continuously in which the rescue center is situated within a predetermined distance of the electronic device or to a designated phone number.

13. The method of claim 1, further comprising notifying a user that the transmitting of the rescue request is made, asking the user about whether to make the rescue request prior to transmitting the rescue request, or automatically transmitting the rescue request when an input is not received for a predetermined period of time after asking the user whether to make the rescue request.

14. An electronic device comprising;
    a communication interface configured to receive disaster information; and
    a processor configured to:
    obtain the disaster information through at least one disaster information service while the electronic device is in a normal mode,
    compare a second location information corresponding to the disaster information with a first location information of the electronic device,
    determine whether the first location information of the electronic device is associated with the second location information,
    convert to an accident detection mode for detecting a user state from the normal mode when the first location information corresponds to the second location information,
    monitor a specific movement of the electronic device during a first time period in the accident detection mode,
    output notification information during a second time period upon the specific movement is detected by the monitoring,
    after outputting the notification information, determine whether a user input associated with the notification information is detected,
    transmit rescue request information upon the user input is not detected during a third time period, and
    convert to the normal mode from the accident detection mode, upon the specific movement is not detected or the user input is detected.

15. The electronic device of claim 14, wherein the processor is configured to determine based on a comparison of disaster occurrence location information according to the disaster information to a location information of the electronic device.

16. The electronic device of claim 15, wherein the processor is configured to enable an accident detection mode that detects the specific movement based on the comparison result of the disaster occurrence location information with the location information of the electronic device.

17. The electronic device of claim 16, wherein the detected specific movement comprises at least one of a fall of the electronic device from a specific height, a movement of the electronic device for a specific time period, and an external impact.

18. The electronic device of claim 16, wherein the processor is configured to disable the accident detection mode when the electronic device ceases receiving the disaster information, or a specific time elapses.

* * * * *